United States Patent [19]

Brown

[11] Patent Number: 4,509,373

[45] Date of Patent: Apr. 9, 1985

[54] CALIBRATION CIRCUIT FOR ULTRASONIC FLOWMETER

[75] Inventor: Alvin E. Brown, Santa Cruz, Calif.

[73] Assignee: Manning Technologies, Inc., Scotts Valley, Calif.

[21] Appl. No.: 502,485

[22] Filed: Jun. 9, 1983

[51] Int. Cl.³ .................... G01F 1/66; G01F 25/00
[52] U.S. Cl. .................................. 73/861.28; 73/3
[58] Field of Search ............ 73/1 DV, 3, 597, 861.27, 73/861.28

[56] References Cited

U.S. PATENT DOCUMENTS 3,780,577 12/1973 Brown .................... 73/861.28
3,981,191 9/1976 Brown et al. .................... 73/861.28

Primary Examiner—Charles A. Ruehl

[57] ABSTRACT

A calibration circuit for an ultrasonic flowmeter of the type described in U.S. Pat. No. 3,981,191 wherein a frequency counted variable delay is used to simulate flow. A stable gated oscillator is used to feed a counter whose accuracy is checked against a frequency standard. A BCD switch is used to load the counter with a count representing a desired variable delay. When the count is reached the oscillator is stopped and a variable delay signal is put out by the counter, to be combined with a fixed delay signal for simulation of flow in the upstream or downstream channel of the flowmeter.

7 Claims, 5 Drawing Figures

CALIBRATION CIRCUIT FOR ULTRASONIC FLOWMETER

DESCRIPTION

1. Technical Field

The invention relates to ultrasonic flowmeters and in particular to an improvement in calibration circuits for such devices.

2. Prior Art

The calibration improvement of the present invention is applicable to signal transmissive flowmeters. One such flowmeter is described in U.S. Pat. No. 3,981,191 to Alvin E. Brown and Niels Thun. The patent describes how fluid flow rate and sound propagation velocity through a fluid are measured. Upstream and downstream transducers are used to generate transmit pulses and reference pulses, delayed in time relative to said transmit pulses. The transmit pulses are directed alternatively upstream and downstream of the flowing medium. The transmitted pulses are received and compared in phase to the received and reference pulses. Logic signals are generated in accordance with the early and late arrival of said received pulses relative to said reference pulses. The statistical average of all early and all late signals is obtained to provide a first signal level related to the sound speed in said medium. Logic signals corresponding to the early and late arrival of signals relative to said reference signals are generated and correlated with the direction of transmission. The statistical average of at least one pair of early and late arrival signals is obtained to provide a second signal level related to fluid flow velocity of said medium. The first and second signal levels for each of said upstream and downstream transmissions are arithmetically combined to vary the delay time of said reference pulses for each of said upstream and downstream transmissions such that said reference pulses track the actual time of arrival of said transmitted pulses.

According to FIG. 1, a channel 1 contains an ultrasonic measuring path 2 which is defined by two ultrasonic transducers 3 and 4 and is disposed obliquely to the direction 5 of flow of the fluent medium through the channel 1. One transmission device 6 is able to pass to the transducer 3 through the line 7 a D.C. impulse S7, which shock excites the transducer at its resonant frequency so that it thereupon passes through the medium in the channel 1 an ultrasonic signal having a frequency of for example 1 MHz. This signal is received by the transducer 4 at the end of the transit time and converted to an electric signal S8 which is fed through a line 8 to receiver means 9. The lines 7 and 8 are interchangeable through a switch 10 so that the transducers 3 and 4 can serve alternately as ultrasonic transmitter and as ultrasonic receiver. Alternatively separate transmitters and receivers may be employed as described in U.S. Pat. No. 3,780,577. In the receiving means 9, a defined arrival signal S11 is obtained from the high frequency signal S8 by means of a zero crossover detector such as that described in U.S. Pat. No. 3,780,577; the signal S11 being passed through a line 11 to comparator means 12. This comparator means simultaneously receives through a line 13 a reference signal S13 with which the arrival signal S11 is compared on a time basis. Line 13 has a calibrator discussed with reference to FIG. 2. The position of the calibrator is indicated by the dashed line 100.

A voltage-controlled oscillator 14 may serve as time generator; it passes its output oscillations as an impulse chain S15 to a counter 16 through a line 15. On commencement of counting, this counter delivers a transmission signal S17 to the transmission means 6 through a line 17. At a predetermined counter content, e.g. 256 impulses, the reference signal S13 is delivered. At an earlier instant (before 256 impulses), e.g. 128 impulses, a receiver readiness signal S18 was passed through a line 18 to prepare the comparator means for measurement. Subsequent to measurement, e.g. 384 impulses, the receiver readiness signal S18 is terminated, thereby disabling the receiver and comparator and protecting against shock excitation during transmission. Finally a signal S19 is fed through a line 19 to a bistable transmission generator 20 which alternately delivers downstream signals S21 and upstream signals S22 through a pair of signal lines 21 and 22, the latter signals then switching the switch 10 over.

When an arrival signal S11 arrives in the comparator means 12, a signal of predetermined, constant amplitude and duration appears at the output 23. If this arrival signal S11 has arrived earlier than the reference signal S13, a signal appears at the output 24. If the arrival signal was determined later than the reference signal, a signal occurs at the output 25. A first row 26 of logic elements links these three output signals in such a way that in a line 27 an early signal S27 occurs having a constant amplitude and the same time duration as the signal occurring at output 23 and a late signal S28 occurs also having a constant amplitude and the same time duration as the signals occurring on outputs 23 and 25.

In an integrating signal level such as a generator integrator 29 all early signals S27 on line 27 are integrated in one direction and all late signals S28 on line 28 in the opposite. By way of convention, the + and − signs in the blocks 29 and 38 indicate the direction of integration of early signals S27 and late signals S28 which in the embodiments both have positive going polarity. For instance, the early signals could be fed to the non-inverting input and the late signals to the inverting input of an operational amplifier serving as an integrator. At the output 30 of the integrator, a main signal S30 occurs in the form of a signal level that is variable by the early and late signals. This main signal S30 can be derived directly at an output terminal 31 through an evaluating circuit such as a meter and used as a measurement for the sonic velocity c of a medium flowing through the channel 1. In addition, this main signal S30 is passed to an input of a summing circuit such as an adder 32.

The early and late signals S27 and S28 are additionally fed to a second row 33 of logic elements, which also have fed to them the downstream and upstream signals S21 and S22. In this way early upstream signals S34, early downstream signals S35, late upstream signals S36 and late downstream signals S37 are obtained at four outputs 34 to 37. A second integrating signal level generator such as an integrator 38 is fed with the early downstream signals S35 with positive sign and the early upstream signals S34 with negative sign and possibly also the late downstream signals S37 with negative sign and the late upstream signals S36 with positive sign. As a result, an auxiliary signal S39 is produced at the output 39 in the form of a signal level dependent on the signals S34 to S37.

This auxiliary signal S39 is fed directly to an output terminal 40 from which the flow velocity v of the medium flowing in the channel 1 can be taken directly through an evaluating circuit. In addition, the auxiliary signal S39 is fed through a switch 41 alternately to the positive and the negative second input of the summating circuit or adder 32. The switch 41 which may be an analog switch is operated by the downstream and upstream signals S21 and S22. Control signals S43 and S44 therefore alternately occur at the output 42 of the adder, these signals corresponding to the sum of or difference between, respectively, the main signal S30 and the auxiliary signal S39. These control signals S43 and S44 control the voltage-controlled oscillator 14 in such a way that the pulse train S15 alternately has a higher frequency $f_1$ associated with the downstream measurement and a lower frequency $f_2$ associated with the upstream measurement.

The circuit forms a regulating circuit in which solely by the statistical evaluation of the early and late signals during the upstream and downstream measurement an adjustment of the delay period occurs in such a way that the latter accurately coincides with the transit time after a few individual measurements. This regulation takes place with a relatively high accuracy independently of the quality of the components provided in the regulating circuit.

When the frequencies $f_1$ and $f_2$ occur by summation and subtraction of the main signal S30 and auxiliary signal S39, a simple calculation will show that the main signal S30 is a relatively accurate measure of or proportional to the mean value $(f_1+f_2)/2$ and the auxiliary signal S39 is a relatively accurate measure of or proportional to half the difference $(f_1-f_2)/2$ of the two frequencies $f_1$ and $f_2$. However, since this mean value is proportional to the sonic velocity of the medium flowing in the channel 1 and the difference is proportional to the flow velocity of this medium, one can connect output terminals 31 and 40 directly to the outputs 30 and 39 to derive signals corresponding to the sonic velocity c and flow velocity v, respectively. These signals may have an extraordinarily high accuracy because they can be derived directly from the self-compensating regulating circuit.

In order to calibrate the above circuit, the calibrator 100, shown in more detail in FIG. 2 has been used. The calibrator consists of two one-shot multivibrators 51 and 52. The first multivibrator 51, controlled by an upstream and downstream transducer control function, delays the reference signal only, e.g. upstream, by a preset amount. This delay of one reference signal simulates flow since it appears identical to a delay in the received signal. The second one shot multivibrator 52, in series with the first one shot multivibrator provides additional delay to simulate the decision time required in the signal detector 9. The delay of the one shot multivibrator 51 may be on the order of one hundred nanoseconds or longer.

The problem experienced in the prior art is that it is very difficult to maintain the accuracy and stability of the one shot multivibrator 51. An error of only a few nanoseconds may translate to inaccuracy of several percentage points of accuracy. Generally, one shot multivibrator 51 should have a variable amount of delay so that various levels of flow can be calibrated. One shot multivibrator 52, on the other hand, is not as critical so long as it generally matches the decision time delay of the signal detector 9. This is a fixed value and is not generally as difficult to control as the simulation of flow by delay of the reference pulse.

In order to establish greater stability in multivibrator 51, the tolerance and stability of components must be extreme. In practice, it is very difficult to achieve in a production environment.

Accordingly, an object of the invention was to devise a calibration circuit which simulates flow in a manner wherein extreme accuracy can be established using ordinary components. Another object of the invention is to devise a calibration circuit for a flow meter such that the flow meter has an accuracy which can be tested against a standard.

DISCLOSURE OF INVENTION

The above objects have been achieved with a new calibrator using a phase detector, as in the prior art, but with a frequency counted variable delay signal for comparing a received acoustic signal against the variable delay calibration signal for generating early and late output signals. The variable delay of the present invention is attributable to a frequency count from a stable source. Since the accuracy of a counter may be verified against a standard, a higher degree of accuracy may be maintained. Generally, the counter counts oscillations which are equivalent to increments of the reference signal desired to simulate flow.

A settable switch is connected to the counter for programming the desired count such that various levels of flow may be simulated, thereby allowing the meter to be calibrated at various points in its span.

BEST MODE FOR CARRYING OUT THE INVENTION

Figure 2:
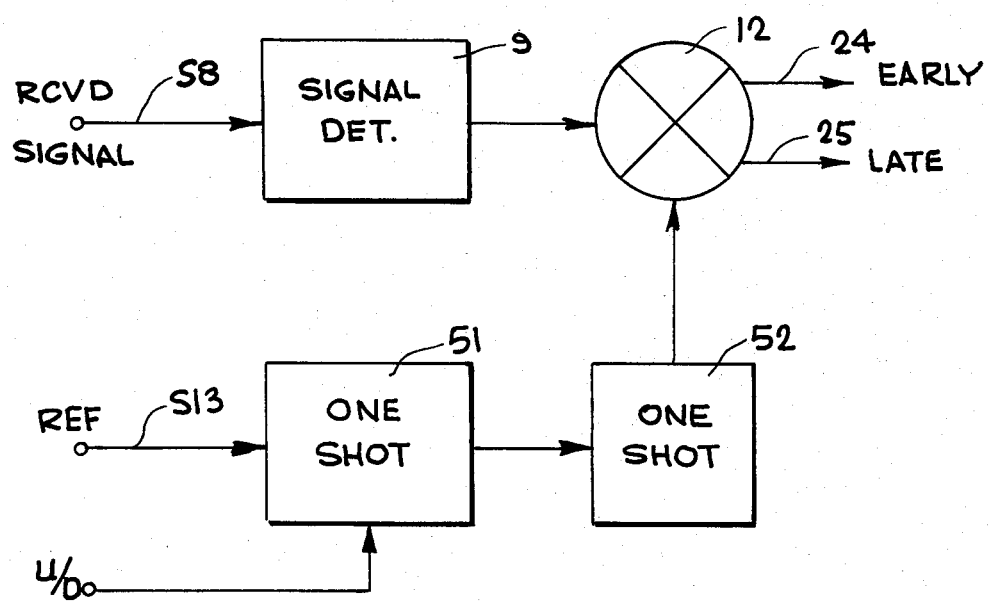
FIG. 2 is an electrical plan of a calibration circuit for the flow meter of FIG. 1.
Figure 3:
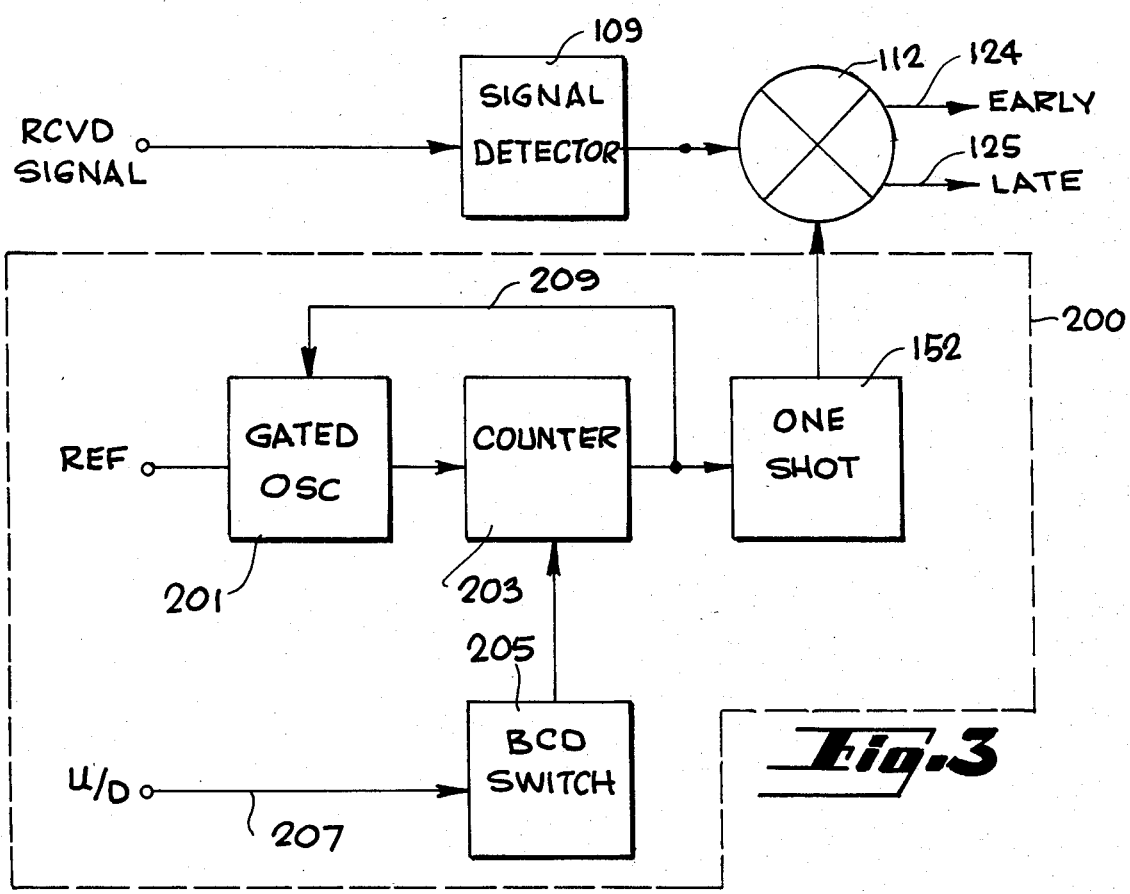
FIG. 3 is an electrical plan of a calibration circuit of the present invention.

With reference to FIG. 3, a signal detector 109 is shown connected to a comparator means 112. Signal detector 109 and comparator 112 are substantially the same as signal detector 9 and comparator 12 in FIG. 2. A one-shot multivibrator 152 is connected to comparator 112 as in FIG. 2. The output of one-shot 152 and signal detector 109 serves to generate the early and late signals taken along lines 124 and 125 of comparator 112, as previously described. The present invention relates to a frequency controlled variable delay which is established through gated oscillator 201 working in combination with counter 203 and BCD switch 205. The frequency count at the variable delay is used for calibrating either the upstream or downstream channel, but not both. The down/up signal on line 207 will load the counter 203 with the number set in switch 205 for the selected direction only, e.g. upstream, and will not load the number when the meter is in the downstream condition. In the downstream case, the oscillator produces no delay. The BCD switch 205 is set by an up/down count received along line 207. This count sets a number in switch 205 which is fed to counter 203. When the gated oscillator generates the number of counts, as measured by counter 203, a stop pulse is generated along line 209, shutting off the gated oscillator and clocking the one-shot multivibrator 152. The one-shot 152 generates another fixed delay, equal to the decision time of signal generator 109 for the purpose of balancing such decision time in the comparator 112. The second delay is not necessary, but does reduce secondary error terms. The result is that the variable delay established by the gated oscillator 201 and counter 203 simulates flow by providing an upstream reference signal with a desired delay and providing an unaltered downstream reference. Since the frequency counting ability of counter 203 can be measured very accurately, the accuracy of the instrument may be very well known. For example, by obtaining a frequency standard from the National Bureau of Standards, the accuracy of counter 203 may be checked very accurately. Gated oscillator 201 need not be accurate in holding any particular long-term frequency, but its pulse repetition rate must be uniform; i.e., it must be very stable over the period of calibration. A nominal frequency of 10 MHz is desirable so that pulses will have a duration of 100 nanoseconds. A single 100-nanosecond pulse may be counted three, six and nine times to establish typical levels of flow in an ultrasonic flowmeter of the type described. A 900-nanosecond delay between upstream and downstream reference signals would correspond to full scale under such circumstances. These delays are typical, but not critical. Delays will be different for changes in pipe diameter.

Figure 1:
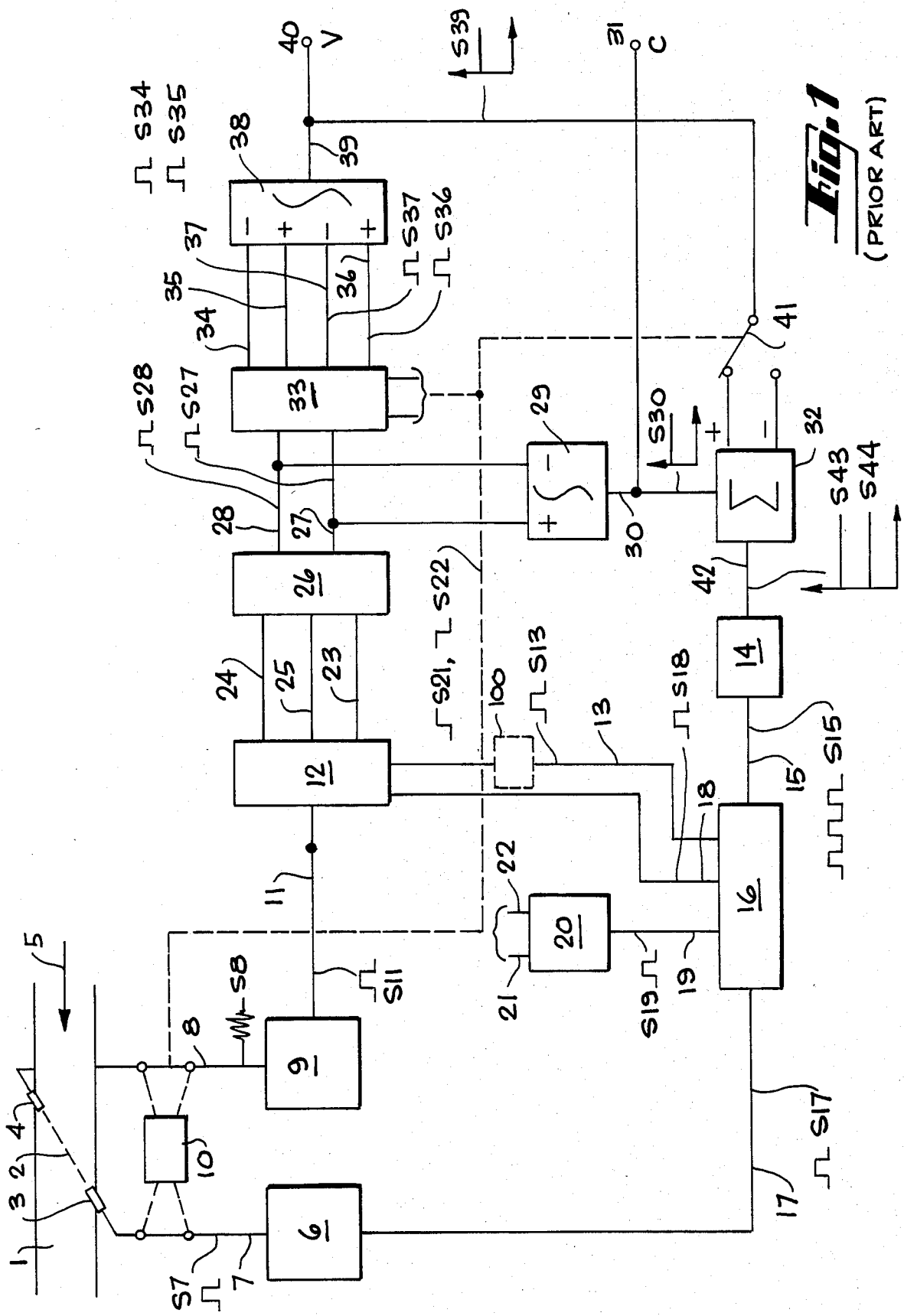
FIG. 1 is an electrical schematic of a flow meter of the prior art.

The dashed line 200 in FIG. 3 corresponds to the dashed line 100 in FIG. 1. In other words, the apparatus within the dashed line is suitable for use in ultrasonic flowmeters of the prior art and specifically in the type described previously with reference to FIG. 1.

The measured gated oscillator frequency has a characteristic period $\Delta t$ which nominally might be 100 nanoseconds, as previously mentioned. The transit time through the flowing media for an ultrasonic pulse, $\tau$, is another system characteristic. The two characteristics are combined by the equation:

$$V(\Delta t/\tau^2)=K$$

where V equals flow velocity, and K is a constant, a characteristic for that particular flowmeter. Each flowmeter has a characteristic K which is useful for determining flow velocity once calibration has been achieved.

Figure 4:
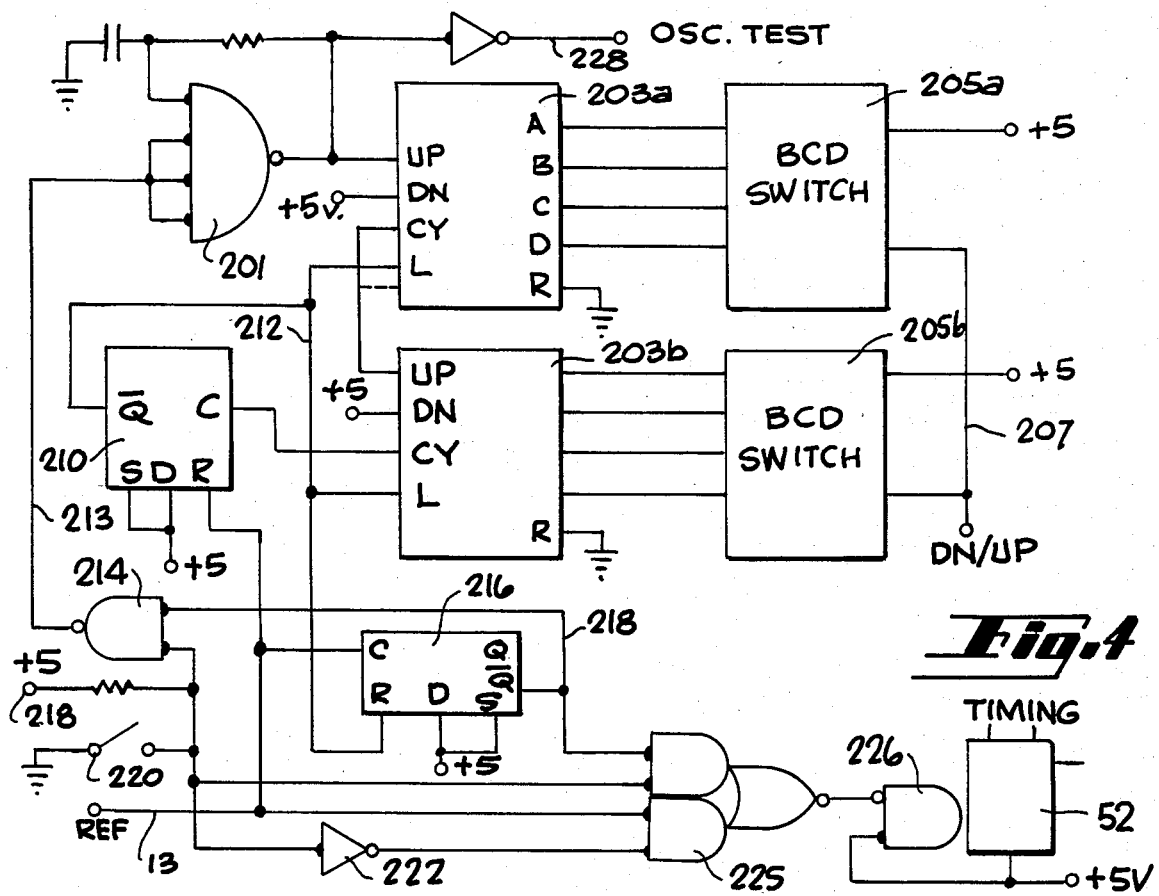
FIG. 4 is an electrical schematic of the calibration circuit of FIG. 3.

The plan view of FIG. 3 is explained in more detail with reference to FIG. 4 wherein the components shown within dashed line 200 are more fully illustrated. In FIG. 4 the gated oscillator 201 is a Schmidt trigger circuit which in practice may be an integrated circuit, type 74LS13, connected to a pair of binary counters 203a and 203b. Counters 203a and 203b are connected in series such that the carry bit of counter 203a is connected to the "up" bit of counter 203b. A pair of BCD switches 205a and 205b load a binary coded decimal, BCD, into the counters 203a and 203b thereby setting the desired count. BCD switch 205a loads the least significant digit of the count while BCD switch 205b sets the most significant digit. The BCD switches are fed with a count determining number via the down/up line 207. The counters 203a and 203b may be 74LS192 type of integrated circuits. A D-type flip-flop 210 serves to load the counters 203a and 203b by means of line 212 connected to the load terminal of each counter. A NAND gate 214 provides the gating for oscillator 201 along line 213. This gate is connected both to control flip-flop 216, a D-type flip-flop, as well as to a bias supply 218, a grounding switch 220, an inverter 222 and an AND-OR INVERT circuit 225 (AOI). The AOI circuit is connected to the input gate 226 of a one-shot multivibrator 52 which provides the fixed delay corresponding to the decision time of the signal detector previously described.

Note that the BCD switches 205a and 205b have two inputs, one labeled +5, the other fed by line 207 with the down/up signal, a complement of the up/down signal. When both inputs are high, only highs can be loaded into the counters regardless of the switch position. To do this, the common input is held high, by +5 volts, and the complementary input is taken to the down/up line 207. When this line goes low, the complement of the switch position is applied to the data inputs of the counter. If a load pulse occurs, the counters 203a and 203b will be loaded with the number in the switch. The load of the binary number, 1111, always occurs on the high cycle, downstream cycle. On the low cycle, upstream cycle, the complement of the switch is loaded. If the switch reads a digit 2, the binary load will be 1101. In the first case a carry will result on the first positive going edge of the clock. In the upstream case, two more clock pulses are required to cause the counter 204 to generate a carry which will clock flip-flop 210.

Recall that calibration is measured with respect to a reference signal, S13, which originates from VCO 14 in FIG. 1. This reference signal is fed along line 13 and initiates the calibration sequence by appearing at the reset terminal of load flip-flop 210. The reset pulse brings the $\overline{Q}$ terminal of this flip-flop high, causing load line 212 to go high, thereby terminating a previously initiated cycle of the counters 203a and 203b. Simultaneously, the reference signal clocks control flip-flop 216 at its clock terminal driving an output pulse from the $\overline{Q}$ output of the flip-flop along line 218. This would bring line 218 low, causing the output of NAND gate 214 to go high, thereby starting the output of oscillator 201.

The first oscillator pulse causes a carry from the counters, assuming 1111 was previously loaded, i.e. down/up was high. This carry clocks the load flip-flop 210 causing an output along the $\overline{Q}$ output and a signal along load line 212 so that the counters are placed in a load condition. Simultaneously, the control flip-flop 216 is reset and an output signal is delivered to the AOI circuit 225 which in turn delivers an output to the one-shot multivibrator 52 through buffer gate 226. This output goes to both the early and late channels and serves to equalize them.

The first pulse of the oscillator 201 has a different pulse width than all subsequent pulses. It is therefore convenient to remove its effect by making it common to both upstream and downstream reference delay times. After the completion of this cycle the down/up signal changes state. With this signal now low, the complement of the switch positions are loaded into the load-enabled counters. After the next reference pulse, the counter will provide the number of pulses plus the first pulse which compensates for the one pulse of the previous cycle. This provides a fixed delay of one pulse on downstream transmissions and the switch-set number of counts plus one pulse on upstream transmissions. The difference in the upstream and downstream reference pulses is the same thing as flow.

An oscillator test terminal 228 is provided for measuring oscillator frequency. A frequency counting switch 220 is provided. When this switch is closed, the bias from terminal 218 is shorted and the reference pulse along line 13 is driven directly through the AOI circuit 225.

Figure 5:
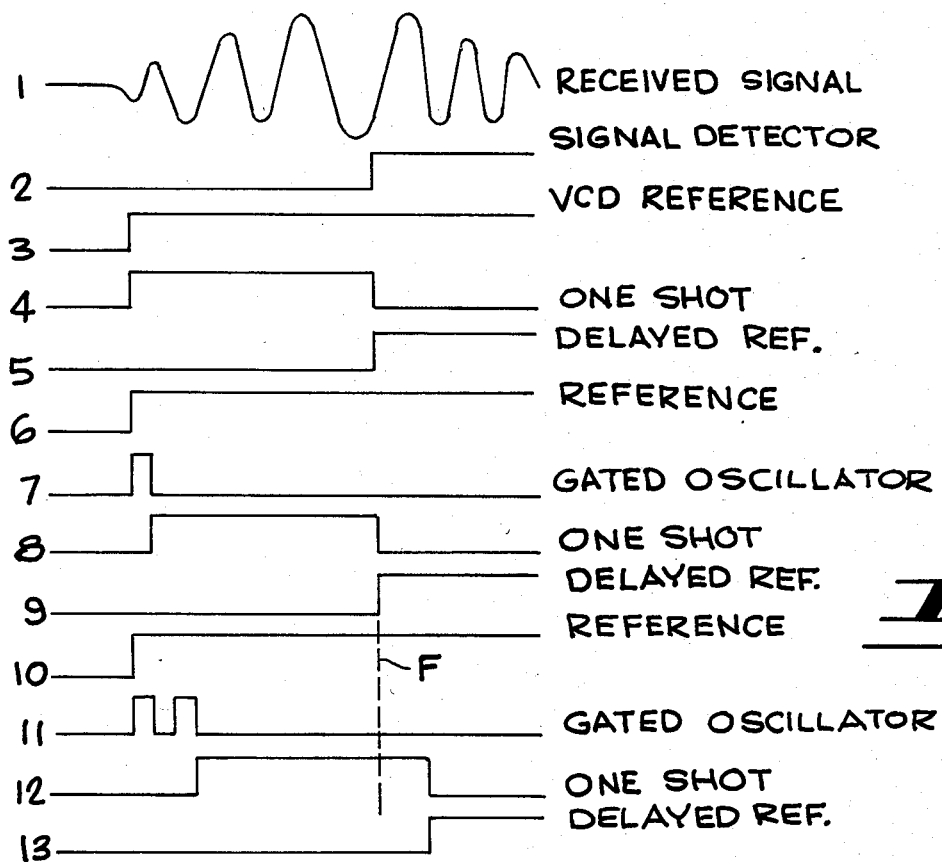
FIG. 5 is a wave form diagram illustrating operation of the present invention.

The operation of the circuit of FIG. 1, with the calibrator of FIG. 4 inserted, may be understood with reference to the waveforms illustrated in FIG. 5. A received signal from a signal receiver amplifier is illustrated in plot 1. This signal goes to a signal detector which produces a digital signal indicating reception of the analogue signal, as indicated in plot 2. In the reference channel, the fourth cycle of the voltage controlled oscillator 14 generates a reference pulse, shown in plots 3, 6 and 10. In the prior art circuits, the reference pulse fired a one-shot multivibrator of fixed pulse width, as shown in plot 4, having a delay equal to that of the signal detecting process. This one-shot provided a delayed reference pulse, indicated in plots 5 and 9 which is made to coincide with the detector pulse of plot 2. This gives the same effect as if the reference pulse of plot 3 were matched to a first sound in the received signal of plot 1. In the prior art circuit of FIG. 2, a calibration one-shot multivibrator 51 was inserted into the upstream reference pulse, similar to plot 7, serving to simulate flow. However, because of instabilities in the one-shot and the inability to set and hold required pulse widths, this proved to be troublesome. Rather than providing the fixed one-shot 51, the present invention provides that any number of pulses can be added to the upstream loop for positive calibration or to the downstream loop for negative calibration. The reference pulse of plot 6 starts the gated oscillator 201. If the counter associated with the oscillator is set to zero, the pulse will carry as in plot 7. Plot 8 performs the same function as plot 4, again showing the prior art fixed delay from a multivibrator which is no longer used. Plot 11 illustrates a number of pulses which are counted by the counters. These pulses are added to one channel only. The other direction has the counter control switches disabled by the up-down signal. The one-shot signal illustrated in plot 12 is shifted relative to the dashed line F, producing a condition equal to flow. A new delayed reference signal is illustrated in plot 13.

By counting pulses from the gated oscillator in a counter whose accuracy may be checked by a frequency standard, the readout of an ultrasonic flowmeter may be checked or adjusted for calibration purposes.

What is claimed is:

1. In a flowmeter of the type using upstream and downstream acoustic signals to measure flow by means of early and late arrival of acoustic signals in comparison to a reference, a calibration circuit comprising, phase detector means comparing a received acoustic signal input against a variable delay calibration signal input for generating early and late output signals, and means for generating a frequency counted variable delay, said variable delay means connected in series to a fixed delay means, the output of said fixed delay means connected to said phase detector means as said variable delay calibration signal.

2. The calibration circuit of claim 1 wherein said means for generating a frequency counted variable delay comprises a frequency counter connected to an oscillator having a frequency related to whole number increments of delay for said frequency counter.

3. The calibration circuit of claim 2 wherein said frequency counter is connected to said oscillator in a feedback loop.

4. In a flowmeter of the type using upstream and downstream acoustic signals to measure flow by means of measuring early and late arrival of acoustic signals in comparison to a reference, a calibration circuit comprising, phase detector means comparing a received acoustic signal input against a variable delay calibration signal input for generating early and late output signals, a frequency counter having a variable preset count for establishing a desired delay in communication with said phase detector, and an oscillator connected to said frequency counter, said oscillator having a frequency related to whole number increments of delay for said frequency counter.

5. The calibration circuit of claim 4 wherein said frequency counter is connected to said oscillator in a feedback loop wherein said oscillator is cut off upon reaching said preset count.

6. The calibration circuit of claim 4 wherein said counter is connected to a BCD switch for loading a preset whole number representing the desired variable delay.

7. A method for calibrating a flowmeter of the type using upstream and downstream acoustic signals to measure flow by means of early and late arrival of acoustic signals in comparison to a reference comprising, forming a variable signal delay by counting cycles of an oscillator, simulating upstream or downstream acoustic signals with said variable signal delay thereby simulating flow, and checking the accuracy of the cycle count against a frequency standard as a calibration measurement.

* * * * *